July 21, 1953 D. P. DONCASTER 2,646,283

RECORD PLAYER

Filed April 9, 1948 3 Sheets-Sheet 1

INVENTOR.
DANIEL P. DONCASTER
BY Pennie, Edmonds, Morton and Barrows
ATTORNEYS

RECORD PLAYER
Filed April 9, 1948 3 Sheets-Sheet 2
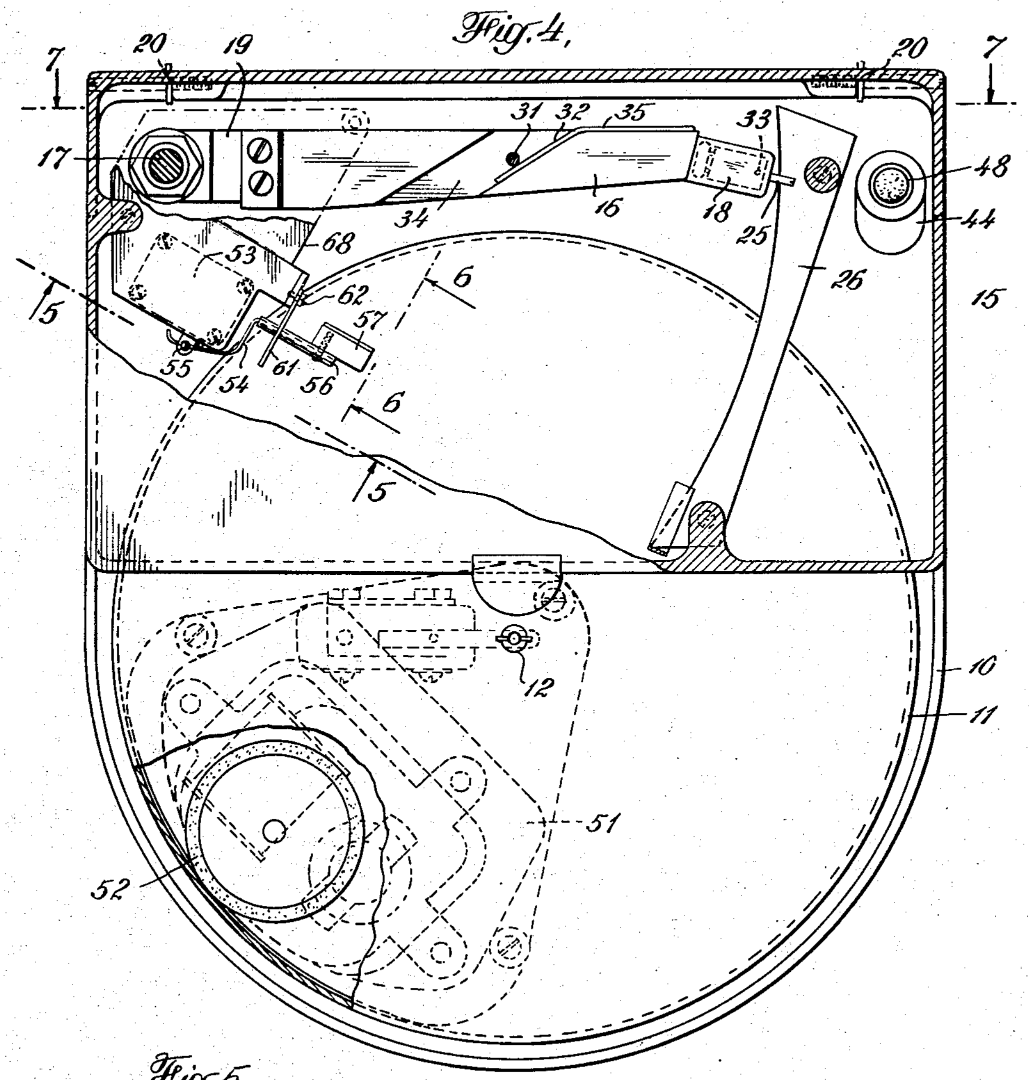
Fig. 4,
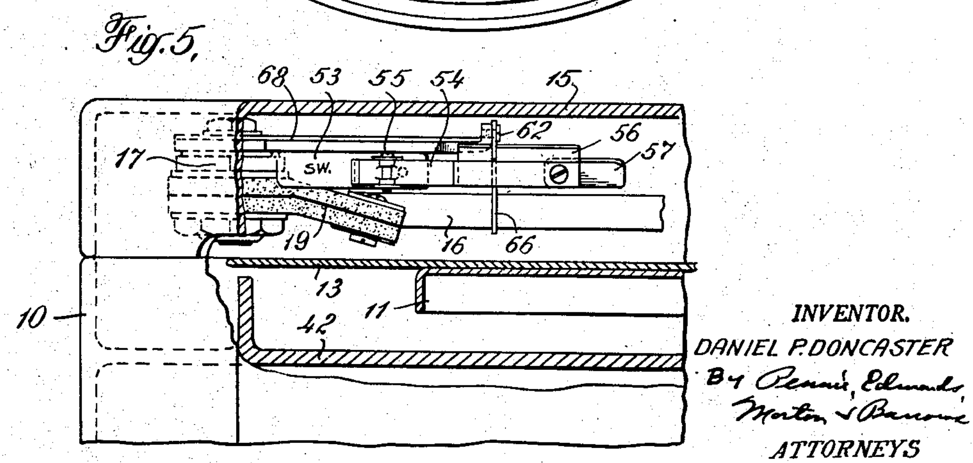
Fig. 5,
INVENTOR.
DANIEL P. DONCASTER
By Pennie, Edmonds, Morton & Barrows
ATTORNEYS July 21, 1953 D. P. DONCASTER 2,646,283
RECORD PLAYER
Filed April 9, 1948 3 Sheets-Sheet 3
Fig. 6,
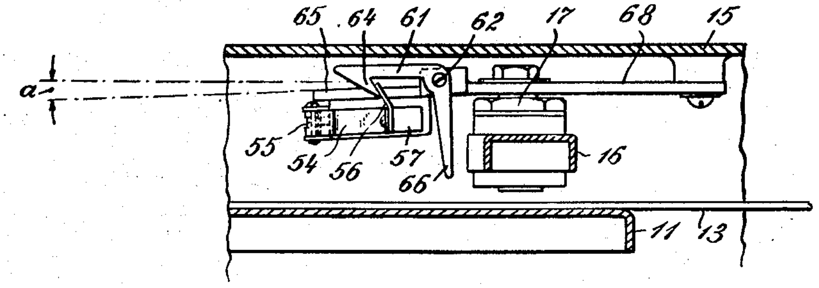
Fig. 7,
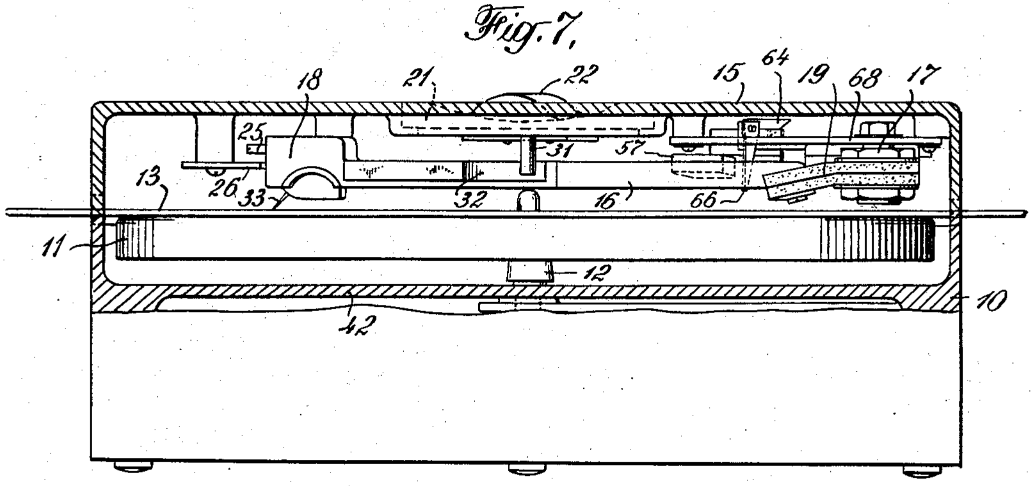
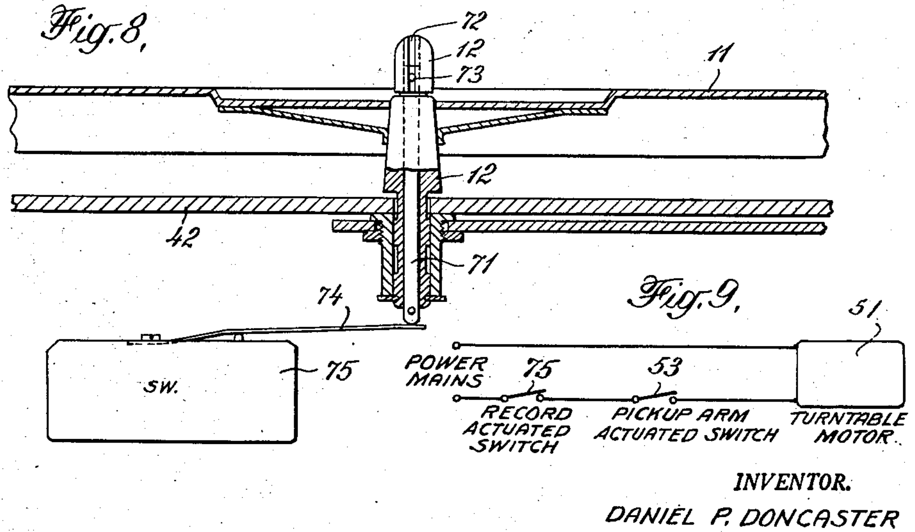
Fig. 8, Fig. 9,
INVENTOR.
DANIEL P. DONCASTER
BY
Pennie, Edmonds, Morton & Barrows
ATTORNEYS Patented July 21, 1953 2,646,283

UNITED STATES PATENT OFFICE 2,646,283

RECORD PLAYER

Daniel P. Doncaster, Long Island City, N. Y., assignor to Columbia Broadcasting System, Inc., New York, N. Y., a corporation of New York Application April 9, 1948, Serial No. 19,924

7 Claims. (Cl. 274—2)

This invention relates to phonographs, and provides an improved record player which is simple to operate and requires a minimum of attention on the part of the user.

Phonographs have been made for a great many years and at the present time may be broadly classified into two categories. One of these consists of automatic record players designed to play a number of records automatically in sequence. Such players may be made fairly simple to operate, but in general are rather complicated in design and hence are expensive and prone to get out of order. The other category consists of single record players wherein individual records are placed on the turntable by hand. Such players are much cheaper and more reliable, but require considerable manipulation and attention on the part of the user. In particular, care must be exercised to place the pickup on the record gently, and to avoid misplacing the stylus too far inwards or too far outwards.

The present invention is directed primarily to players of the single record type, and is designed to minimize the number of manipulations required to play records and to minimize the care and attention required of the user.

While generally useful with any type of disc record, the player is particularly useful with the long-playing indexed records described in Goldmark application Serial No. 19,922, filed April 9, 1948, now abandoned. The invention of that application provides a record having a plurality of concentric annular sound zones in which different selections may be recorded. An annular spacing zone is provided between successive sound zones having a stylus-guiding groove joining adjacent sound grooves. The location of the spacing zone is determined in accordance with a predetermined scale, and a corresponding series graphic symbol placed on the label area of the record disc to indicate the position of the spacing zone. For example, the scale may be a linear radial scale in millimeters with "0" indicating the starting position on a 12 inch record, and the position of a spacing zone preceding a given selection indexed on the label by a numeral corresponding to the number of millimeters radially inwards at which the spacing zone occurs. The spacing zone, while relatively narrow compared to the sound zones, is sufficiently wide to provide a margin of error in the placing of the pickup on the record. Advantageously, fine grooves and slow rotation, say 33⅓ R. P. M., are employed so as to provide a long-playing record with a plurality of selections recorded on one side.

When the player of the present invention is used with such records, long-playing times may be secured without any attention whatever on the part of the user, and any desired selection indexed on the record may be played at will by a simple convenient setting of the player.

In accordance with the invention, a record player is provided in which the reproducer arm is pivoted to the under side of a cover which extends over at least a portion of the turntable, and is so mounted as to engage a record on the turntable when the cover is lowered. A starting position setting device is mounted on the cover and arranged for manual operation from the upper side thereof. The setting device has an associated locating member below the cover which engages the reproducer arm to establish the starting position thereof on a record. Advantageously, the reproducer arm is arranged so that when the cover is raised at the end of a record, the reproducer arm falls by gravity from its record-finishing position to a starting position determined by the position of the setting device. A calibrated scale is associated with the setting member and visible from above the cover so that the starting position may be simply and expeditiously predetermined. Advantageously, the setting device is arranged to be continuously adjustable for starting positions at any point between the beginning and substantially the end of a record. The scale is preferably calibrated in accordance with the predetermined scale used in indexing records of the type disclosed in Goldmark application Serial No. 19,922, mentioned above, so that the record player may be readily preset to play any desired selection on the record. Another feature of the invention is the provision of a cutoff switch mounted on the cover for shutting off the player when the end of the record is reached. The cutoff switch is arranged to be automatically reset when the cover is raised. A switch is also provided for actuation by the weight of a record, so that the circuit to the turntable motor is completed only when a record is on the turntable.

A player with the features of the present invention is extremely simple to operate. To play a series of records of the same diameter, it is sufficient to simply raise the cover with one hand, change the record or turn it over with the other hand, and lower the cover. A minimum number of movements is required and each movement is uncritical. If it is desired to play records of different diameter, or different selections of a single record, a simple adjustment of the setting device from above the cover takes care of the matter. It is unnecessary to place the pickup carefully by hand at a precise location on the record since this is taken care of automatically by closing the cover.

The invention will be more fully understood from the following description of specific embodiments taken in conjunction with the accompanying drawings, in which:

Fig. 4 is a plan view with a portion of the cover broken away to show the mechanism mounted thereunder;

Fig. 5 is a sectional detail taken along the line 5—5 of Fig. 4, showing the arrangement of the cutoff switch;

Fig. 6 is a sectional detail taken along the line 6—6 of Fig. 4, showing further details of the cutoff switch;

Fig. 7 is a rear view, partially in section, taken along the line 7—7 of Fig. 4;

Fig. 8 is a sectional detail showing the record-actuated plunger and associated switch;

Fig. 9 is a circuit diagram of the turntable motor with associated switches.

Figures 1, 2:
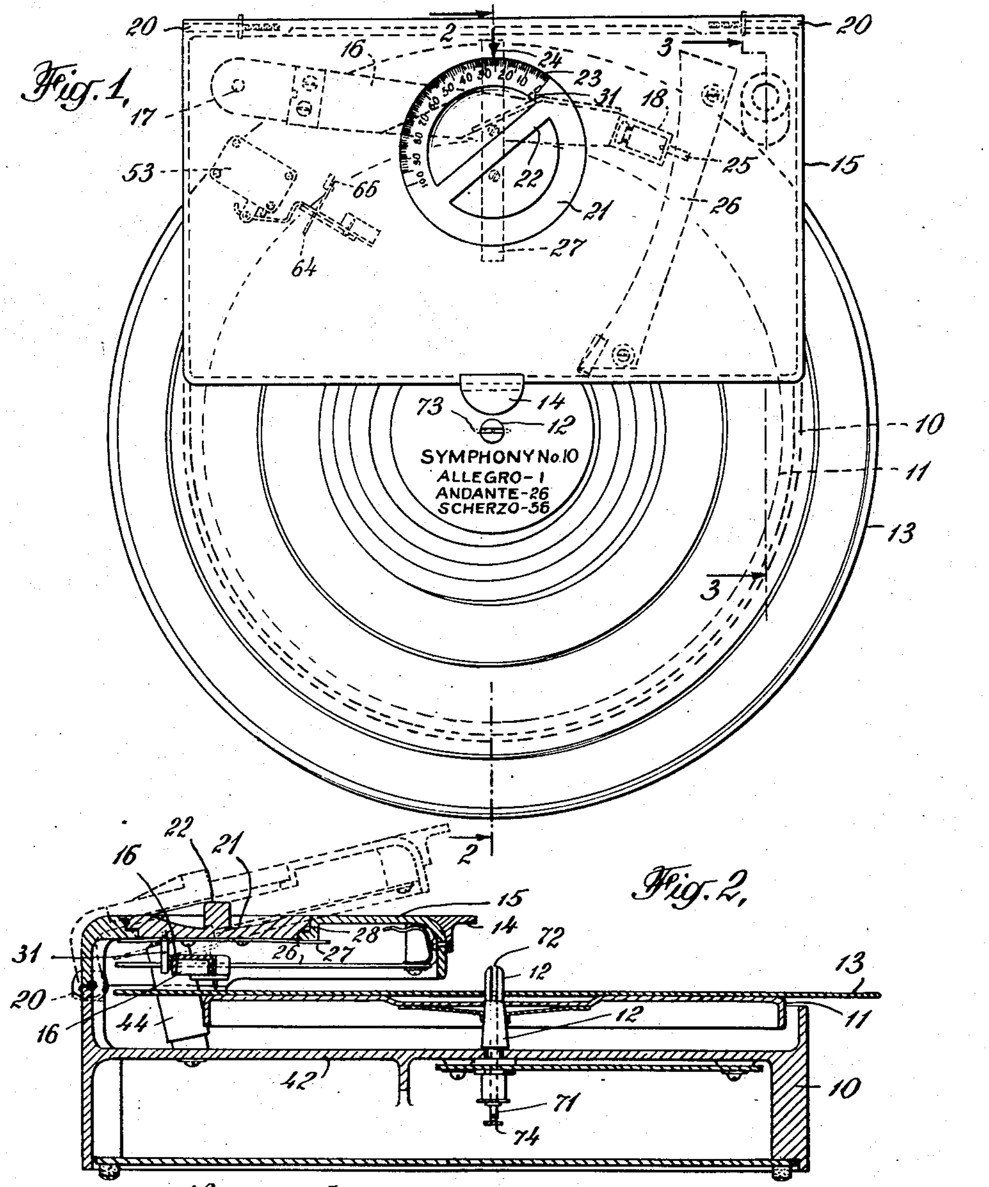
Fig. 1 is a plan view of a record player designed in accordance with the invention, with a record on the turntable.
Fig. 2 is a section taken along the line 2—2 of Fig. 1.

Referring to Figs. 1 and 4, a box 10 is shown, in which is mounted a turntable 11 rotating about the spindle axis 12. The turntable is adapted to receive a record of the disc type, and a record 13 of the type disclosed in application Serial No. 19,922, supra, is shown on the turntable in Fig. 1. If the player is designed to play primarily 10 and 12 inch records, or smaller, the turntable may conveniently be about 9 inches in diameter and the box 10 designed so that records will extend somewhat outside the box. This reduces the size of the box and permits readily placing records on the turntable and removing them therefrom.

Box 10 is provided with a cover 15 which in the drawings is shown as extending over only a portion of the turntable. The cover is hinged at 20 and is provided with a tab 14 for convenient raising. It will be understood that if desired the cover could be arranged to extend over the entire box 10, and the box could be enlarged so that records on the turntable are entirely within it.

A reproducer or pickup arm 16 is pivotally mounted on the under side of cover 15. As shown in the drawings, arm 16 rotates in a horizontal plane (cover assumed closed) about the vertical bearing 17 mounted on plate 28 attached to the under side of the cover. Vertical movement of the pickup head 18 is allowed by the flat spring 19 between the main portion of arm 16 and the bearing 17 (shown more clearly in Fig. 7).

A starting position setting device is mounted on the cover and is shown in Fig. 1 as a dial 21 mounted on the upper side of the cover and manually rotatable by grasping the cross rib 22. A calibrated scale 23 is engraved on the dial and an index pointer 24 is engraved on the cover. On the free end of the reproducer arm a pin 25 is provided which, when the cover is raised, rests on a plate 26 attached to the under side of the cover.

The starting position setting device will be described further with reference to Figs. 1, 4 and 7. A starting position locating member is provided below the cover in the form of pin 31 attached to the under side of dial 21. Pin 31 is positioned to be abutted by pickup arm 16 so as to determine the starting position thereof on a record. It will be noted that the vertical bearing 17 is so located that when the cover is raised about hinges 20, the pickup arm falls by gravity to abut pin 31. The surface 32 of pickup arm 16 is advantageously shaped so that as the pin 31 moves by equal increments in an arc about the pivot point of the dial, the stylus 33 moves radially inwards by substantially equal amounts. In this manner, a linear scale 23 on the dial corresponds to approximately linear movement of the stylus 33 in a radial direction. It is also advantageous to have the range of the setting device extend from the starting position of the largest diameter record for which the player is designed to the minimum diameter of record groove in which sound is recorded.

For convenience, the upper part of the pickup arm 16 has been cut away at 34 to provide room for the pin 31. As the dial is rotated to set the stylus for different starting positions, pin 31 moves along cam surface 32, the design of the cam surface being determined as above. Actually, toward the end of the travel, pin 31 may ride out onto the side 35 of the arm. For other locations of the dial, or for other than circular movement of pin 31, the design of the abutting surface of the arm may be changed accordingly. If desired, the cam surface could be formed on the member moved by the dial, and arranged to engage the pickup arm or a pin attached thereto. Other modifications will occur to those in the art within the principles set forth.

While the foregoing linear relationship of dial rotation and stylus starting position is preferred, if desired any desired relationship may be effected and the dial calibrated accordingly.

The pickup arm may be of any suitable construction, but is here shown as the type described in Goldmark application Serial No. 30,024, filed May 29, 1948. As seen in Fig. 7, when the cover is in closed position, the stylus 33 engages the surface of record 13 carried by turntable 11. In this position, pin 25 on the pickup arm is raised off plate 26 so that the arm is allowed free lateral movement and the necessary amount of vertical movement to follow the record grooves. It will be evident that if the cover is raised, plate 26 will engage pin 25 and raise the pickup off the record. By virtue of the location of the pickup arm bearing 17 with respect to the hinges of the cover (Fig. 1), as the cover is raised pin 25 will slide along plate 26 and the pickup arm will fall to a starting position determined by the setting of dial 21. When the cover is then lowered, the stylus 33 will engage the record at the desired point. Thus, the mere raising of the cover automatically puts the player in condition for starting the same or next record.

While it is preferred to set the dial with the cover in raised position, with light needle pressures and adequate vertical compliance in the pickup arm the dial setting can be changed in the lowered position without injury to the record grooves. Of course, interlocking means could be provided for preventing movement of the dial when the cover is closed, but such additional complication is usually unnecessary.

Fig. 2 shows the cover in raised position in dash lines. Hinges 20 are advantageously located substantially at the level of the top of a record on the turntable. Then, as the cover is lowered, stylus 33 moves in the arc of a circle whose tangent at the record surface is perpendicular.

Thus the stylus is moving vertically downwards as it touches the record and any tendency to move along the record surface or jump grooves is minimized. The hinges 20 are also advantageously so designed as to limit the angle by which the cover may be raised. This maintains the dial in easily readable condition at all times so as to facilitate the setting thereof. Dial 21 is maintained in any position by a Phosphor bronze spring 27 which is attached to the under side of the dial with the free ends overlapping the cover. Any desired tension may be produced. A non-metallic washer 28 may be inserted between the dial and its seat in the cover to promote smooth rotation. With a lightweight pickup arm the shock of the arm striking pin 31 is inappreciable and will not disturb the setting thereof. Limiting the angle through which the cover may be raised limits the amount of shock produced by the falling of the arm, and may be helpful in some cases. With a lightweight arm and sufficient spring pressure, the cover may be raised any amount desired.

Figure 3:
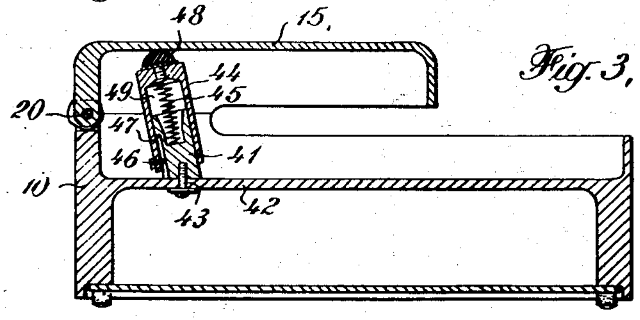
Fig. 3 is a section taken along the line 3—3 of Fig. 1.

It is advantageous to provide means for preventing sudden dropping of cover 15, inasmuch as the stylus engages the record toward the end of the closing. As shown in Fig. 3, a dash pot is advantageously provided so that the final portion of the closing is slow and gentle. Plunger 41 is attached to the mounting plate 42 in box 10 by means of screw 43. A cylindrical member 44 surrounds plunger 41 and is pressed upwards by compression spring 45. A set screw 46 limits the upward movement of cylinder 44 when it engages abutment 47 on plunger 41. A soft tip 48, for example, of felt, is provided for engagement with cover 15. When the cover is raised, cylinder 44 is pressed upwards by spring 45 and chamber 49 fills with air. Although a separate port may be provided for this purpose, it has been found satisfactory to provide a slight clearance between cylinder 44 and piston 41 so as to allow leakage of air therethrough. When the cover 15 is released, it engages tip 48 and forces cylinder 44 downwards. The air in chamber 49 is compressed and forced out of the chamber by leakage between the sliding surfaces. This gives the usual dash pot action and the final movement of the cover is slow and gentle. Spring 45 is selected to give sufficient pressure to push cylinder 44 upwards when the cover is raised, but is not sufficiently strong to prevent the closing of the cover by its own weight.

As shown in Fig. 4, turntable 11 is driven by motor 51 through a rim driving wheel 52. Such driving mechanisms are well known and need not be described in detail. The circuit for controlling the energization of the motor is shown in Fig. 9. Two switches are arranged in series to control the application of voltage to the motor. One switch 53 is actuated by the pickup arm, and the other switch 75 by the weight of the record.

Referring to Figs. 4, 5 and 6, switch 53 is mounted on plate 68 attached to the under side of the cover and has an actuating lever arm 54 pivoted at 55. The lever arm actuates a plunger in the switch which may be of the well known microswitch type. Lever arm 54 is provided with a plate 56, bent at a slight angle as shown in Fig. 6, and a small weight 57.

The switch 53 is normally held in closed position by the engagement of angle plate 56 with detent 61. The detent is in the form of a right angle pivoted at 62 to plate 68. The head of detent 61 has a hook 64, inclined at the proper angle to engage angle plate 56. The switch 53 is mounted on the end 65 of plate 68, and portion 65 is bent downwards at a small angle *a*. This tilts the pivot axis 55 slightly outwards so that when detent 61 releases lever arm 54, the weight 57 attached to the arm causes it to move outwards and open switch 53. Instead of tilting the whole switch, axis 55 alone could be tilted. The entire arm may be made sufficiently heavy for the purpose without employing additional weight 57, if desired.

One leg 66 of detent 61 is positioned to be abutted by pickup arm 16 when it has reached the runoff groove at the end of a record. At this point, the pickup forces detent 61 in a clockwise direction (Fig. 6) thereby disengaging angle plate 56 and permitting lever arm 54 to swing by gravity to its open position. This stops the motor.

If, now, the cover is raised, lever arm 54 swings back by gravity to its closed position. The orientation of the switch and lever arm with respect to the hinges 20 of the cover are shown in Fig. 4, and it is evident that upon raising the cover, weight 57 will act to reclose switch 53. Upon closure, detent 61 also swings by gravity to the position in which hook 64 reengages the angle plate 56, and the switch is maintained in closed position until again actuated by the pickup arm.

It is thus seen that the simple act of raising the cover not only returns the pickup arm to its starting position, but also resets the cutoff switch so that the turntable will again start (provided there is a record thereon). The use of the force of gravity to open and reclose switch 53 is simple and reliable. However, if desired, spring action may be employed instead.

In order to turn off the motor when no record is on the turntable, the mechanism of Fig. 8 is provided. Turntable spindle 12 has a vertical hole running therethrough in which is mounted a plunger rod 71. The upper end of spindle 12 is provided with slots 72 in which travels cross pin 73 affixed to the top of plunger 71. Cross pin 73 extends outwardly from spindle 12 as shown in Fig. 1. The lower end of plunger 71 engages lever arm 74 of switch 75, which may be of the microswitch type. Lever arm 74 is normally spring biased upwards to its open position, and tends to hold plunger 71 in the up position. Thus, with no record on the turntable, switch 75 is open and plunger 71 is in raised position with cross pin 73 above the surface of the turntable (as shown in Fig. 8). When a record is placed on the turntable, it engages pin 73 and the weight of the record forces the plunger 71 downwards and closes switch 75. This completes the circuit to the motor as shown in Fig. 9.

The operation of the record player will now be described. It will be assumed that the player has been designed for use with 10 and 12 inch records, it being understood that it may be designed for records of any other desired diameter. If it is desired to play a 12 inch record, dial 21 will be set to the corresponding starting position which, for the calibrated scale shown in Fig. 1, will be at zero. The cover will then be raised to permit placing the record on the turntable. Pickup arm 16 will be in engagement with pin 31 attached to the underside of the dial and switch 53 will be closed. Upon placing the record on the turntable, switch 75 will close and the turntable will start running. Cover 15 is then released and drops by its own weight to closed position. The final portion of the closing will be controlled by the dash pot arrangement (Fig. 3)

and the stylus will gently engage the record at the desired starting position.

At the end of the record, pickup arm 16 will engage detent 61 (Fig. 6), thereby releasing the arm of switch 53, and the arm swings by gravity to the open position and stops the motor. The cover is then raised and the record removed. This may be done very simply by raising the cover with one hand and removing the record with the other, so that the elapsed time is very short. The raising of the cover causes arm 54 to swing by gravity to reclose cutoff switch 53 and, at the instant of closing, the turntable would start again if the record were not removed. Removal of the record of course opens switch 75 and prevents the motor from starting. It is found in practice that there is a slight interval before cutoff switch 53 recloses, and there is ample time to remove the record before the turntable restarts. Actually there is no difficulty in removing the record even while the turntable is running, particularly if it is of slow speed, e. g., 33⅓ R. P. M.

If desired for any reason, another switch could be inserted in series with the motor to prevent the energization of the motor when the cover is open. However, care should be taken that upon closing the cover, the motor is energized soon enough to bring the turntable up to speed before the stylus engages the record, since otherwise a very disagreeable sound results.

With the cover raised and the record removed, the pickup automatically falls to its starting position and cutoff switch 53 automatically recloses. The record may now be turned over or a new record placed on the turntable, thereby completing the circuit to motor 51 and restarting the turntable. If the record is of the same size as before, no adjustment of dial 21 is required, and the cover is simply released to start the playing of the next record. If, on the other hand, it is desired to change to a 10 inch record, the setting of dial 21 is changed accordingly and the cover then released. Advantageously, a mark is placed on dial 21 showing the starting position for 10 inch records, for example in the form of a red dot. For other size records suitable indicia could be added to indicate their respective starting positions.

The player is especially designed for use with records of the type disclosed in Goldmark application Serial No. 19,922, described hereinbefore. With such a record, it may be desired to play the second movement of a symphony which starts, for example, at "26" on the predetermined scale. If the dial is calibrated in accordance with the same predetermined scale, it is simply set at "26" and, upon releasing the cover, the player will start at the second movement. Thus any desired selection may be played and the starting position of the pickup arm preset by simply setting dial 21 at the proper reading.

The foregoing description described a specific embodiment of the invention in considerable detail. As will be apparent to those in the art, various modifications may be made within the scope and spirit of the invention. Therefore, it will be understood that the foregoing specific embodiment, and the description thereof, are illustrative only and that the invention is limited only by the scope of the following claims.

Reference is made to application Serial No. 19,923, now abandoned, filed jointly by P. C. Goldmark and D. P. Doncaster, in which the starting position setting device described herein is set forth and claimed.

I claim:

1. In a phonograph, the combination which comprises a support mounting a turntable adapted to receive a record, a cover hinged to said support and extending over at least a portion of said turntable, a reproducer arm pivotally mounted on the under side of said cover and adapted to engage a record on said turntable when the cover is lowered, the pivot point of said arm being located so that the arm drops by gravity from its record-finishing position to its record-starting position when the cover is raised, a starting position setting device having a locating member positioned to limit the fall of said reproducer arm when the cover is raised and thereby establish the starting position thereof on said record, said setting device having adjustable means for setting the position of the locating member, an electric motor coupled to drive said turntable, a control switch and actuating mechanism therefor mounted on said cover, said control switch being in circuit with said motor, biasing means associated with said actuating mechanism biasing said switch toward the "off" position when the cover is in closed position and toward the "on" position when the cover is in raised position, and releasable detent means mounted on said cover for retaining said actuating mechanism in the "on" position, said detent means having an element positioned to be actuated by said reproducer arm to release said actuating mechanism when the arm reaches the end of a record.

2. In a phonograph, the combination which comprises a support mounting a turntable adapted to receive a record, a cover hinged to said support and extending over at least a portion of said turntable, a reproducer arm pivotally mounted on the under side of said cover and adapted to engage a record on said turntable when the cover is lowered, the pivot point of said arm being located so that the arm drops by gravity from its record-finishing position to its record-starting position when the cover is raised, a starting position setting device having a locating member positioned to limit the fall of said reproducer arm when the cover is raised and thereby establish the starting position thereof on said record, said setting device having adjustable means for setting the position of the locating member, an electric motor coupled to drive said turntable, a control switch and actuating mechanism therefor mounted on said cover, said control switch being in circuit with said motor, biasing means associated with said actuating mechanism biasing said switch toward the "off" position when the cover is in closed position and toward the "on" position when the cover is in raised position, and releasable detent means mounted on said cover biased to engage and retain said actuating mechanism in the "on" position, said detent means having an element positioned to be actuated by said reproducer arm to release said actuating mechanism when the arm reaches the end of a record.

3. In a phonograph, the combination which comprises a support mounting a turntable adapted to receive a record, a cover hinged to said support and extending over at least a portion of said turntable, a reproducer arm pivotally mounted on the under side of said cover and adapted to engage a record on said turntable when the cover is lowered, the pivot point of said arm being located so that the arm drops by gravity from its record-finishing position to its record-starting position when the cover is raised, a starting position setting device having a locating member positioned to limit the fall of said reproducer arm when the cover is raised and thereby establish the starting position thereof on said record, said setting device having adjustable means for setting the position of the locating member, an electric motor coupled to drive said turntable, a control switch mounted on said cover and in circuit with said motor, said switch having an associated actuating lever arm biased toward the "off" position when the cover is closed, the mass and pivoting of said lever arm being correlated to move the lever arm by gravity to the "on" position when the cover is in raised position, and a releasable detent mounted on said cover positioned to engage said lever arm in the "on" position, said detent having an element positioned to be actuated by said reproducer arm to release said lever arm when the reproducer arm reaches the end of a record.

4. In a phonograph comprising a support mounting a turntable adapted to receive a record, a cover hinged to said support and extending over at least a portion of said turntable, a reproducer arm pivotally mounted on the under side of said cover and adapted to engage a record on said turntable when the cover is lowered, the pivot point of said arm being located so that the arm drops by gravity from its record-finishing position to its record-starting position when the cover is raised, a manually-adjustable setting member on the upper side of said cover with a calibrated scale associated therewith visible from above the cover, and a starting position locating member below said cover actuated by said setting member and positioned to be abutted by said reproducer arm to limit the fall thereof when the cover is raised and thereby establish the starting position thereof, the improvement which comprises an electrical motor coupled to drive said turntable, a control switch mounted on said cover and in circuit with said motor, said switch having an associated actuating lever arm biased toward the "off" position when the cover is closed, the mass and pivoting of said lever arm being correlated to move the lever arm by gravity to the "on" position when the cover is in raised position, and a releasable detent mounted on said cover positioned to engage said lever arm in the "on" position, said detent having an element positioned to be actuated by said reproducer arm to release said lever arm when the reproducer arm reaches the end of a record.

5. In a phonograph, the combination which comprises a support mounting a turntable adapted to receive a record, a cover hinged to said support and extending over at least a portion of said turntable, a reproducer arm positioned to engage and reproduce a record on said turntable, an electric motor coupled to drive said turntable, a control switch and actuating mechanism therefor mounted on said cover, said control switch being in circuit with said motor, biasing means associated with said actuating mechanism biasing said switch toward the "off" position when the cover is in closed position and toward the "on" position when the cover is in raised position, and releasable detent means mounted on said cover for retaining said actuating mechanism in the "on" position, said detent means having an element positioned to be actuated by said reproducer arm to release said actuating mechanism when the arm reaches the end of a record.

6. In a phonograph, the combination which comprises a support mounting a turntable adapted to receive a record, a cover hinged to said support and extending over at least a portion of said turntable, a reproducer arm positioned to engage and reproduce a record on said turntable, an electric motor coupled to drive said turntable, a control switch and actuating mechanism therefor mounted on said cover, said control switch being in circuit with said motor, biasing means associated with said actuating mechanism biasing said switch to the "off" position when the cover is in closed position and including a pivoted lever arm whose mass and pivoting are correlated to move by gravity to the "on" position when the cover is in raised position, and releasable detent means mounted on said cover for retaining said actuating mechanism in the "on" position, said detent means having an element positioned to be actuated by said reproducer arm to release said actuating mechanism when the arm reaches the end of a record.

7. In a phonograph, the combination which comprises a support mounting a turntable adapted to receive a record, a cover hinged to said support and extending over at least a portion of said turntable, a reproducer arm positioned to engage and reproduce a record on said turntable, an electric motor coupled to drive said turntable, a control switch mounted on said cover and in circuit with said motor, said switch having an associated actuating lever arm biased toward the "off" position when the cover is closed, the mass and pivoting of said lever arm being correlated to move the lever arm by gravity to the "on" position when the cover is in raised position, and a releasable detent mounted on said cover positioned to engage said lever arm in the "on" position, said detent having an element positioned to be actuated by said reproducer arm to release said lever arm when the reproducer arm reaches the end of a record.

DANIEL P. DONCASTER.

References Cited in the file of this patent

UNITED STATES PATENTS

| Number | Name | Date |
|---|---|---|
| 756,286 | Runge | Apr. 5, 1904 |
| 1,368,264 | Kittredge | Feb. 15, 1921 |
| 1,429,839 | Boswell | Sept. 19, 1922 |
| 1,517,690 | Abt | Dec. 2, 1924 |
| 1,540,407 | La Rue | June 2, 1925 |
| 2,166,986 | Dally | July 25, 1939 |
| 2,552,757 | Adler | May 15, 1951 |